United States Patent [19]

Komatsubara et al.

[11] 4,238,893
[45] Dec. 16, 1980

[54] SIGNAL TRANSMISSION IN TEACHING SYSTEM

[75] Inventors: Michimasa Komatsubara; Ikuo Shimizu, both of Tokyo, Japan

[73] Assignee: Sony Corporation, Tokyo, Japan

[21] Appl. No.: 957,348

[22] Filed: Nov. 3, 1978

[30] Foreign Application Priority Data

Nov. 8, 1977 [JP] Japan .................. 52-133949

[51] Int. Cl.³ .................. G09B 7/077; G09B 19/06
[52] U.S. Cl. .................. 434/351; 434/157
[58] Field of Search .......... 35/8 A, 8 R, 9 R, 35 C, 35/48 R

[56] References Cited

U.S. PATENT DOCUMENTS

| | | | |
|---|---|---|---|
| 3,140,468 | 7/1964 | Blaisdell et al. | 35/8 A |
| 3,416,243 | 12/1968 | Greenberg et al. | 35/48 R |
| 3,491,464 | 1/1970 | Gray | 35/48 R |
| 3,623,242 | 11/1971 | Hoover | 35/35 C |
| 3,631,612 | 1/1972 | Westerberg | 35/48 R |
| 3,637,940 | 1/1972 | Morchand et al. | 35/8 A UX |
| 3,676,939 | 7/1972 | Oberst et al. | 35/48 R |
| 3,757,220 | 9/1973 | Abel | 35/8 A |
| 3,952,425 | 4/1976 | Tanaka et al. | 35/48 R |
| 4,004,354 | 1/1977 | Yamauchi | 35/48 R |
| 4,048,729 | 9/1977 | Derks | 35/35 C X |

*Primary Examiner*—Vance Y. Hum
*Attorney, Agent, or Firm*—Lewis H. Eslinger; Alvin Sinderbrand

[57] ABSTRACT

In a teaching system having a central or master station and one or more student stations remote from the master station, there are provided, at the master station, at least one source of main signals in a first frequency band, which source may be constituted by a tape or other record player for reproducing teaching or instructional materials, a microphone or other source of audio signals from a proctor or supervisor of the teaching system, and a source of control signals which may include address signals for identifying one of the student stations and command signals for controlling various operations of the addressed student station. The audio and control signals are employed to modulate respective carriers so as to provide first and second auxiliary signals, respectively, in frequency bands which are removed from each other and from the first frequency band of the main signals, whereupon the main signals and the first and second auxiliary signals are multiplexed to provide a composite signal which, in turn, modulates a carrier of predetermined frequency suitable for being transmitted to each of the student stations.

12 Claims, 4 Drawing Figures

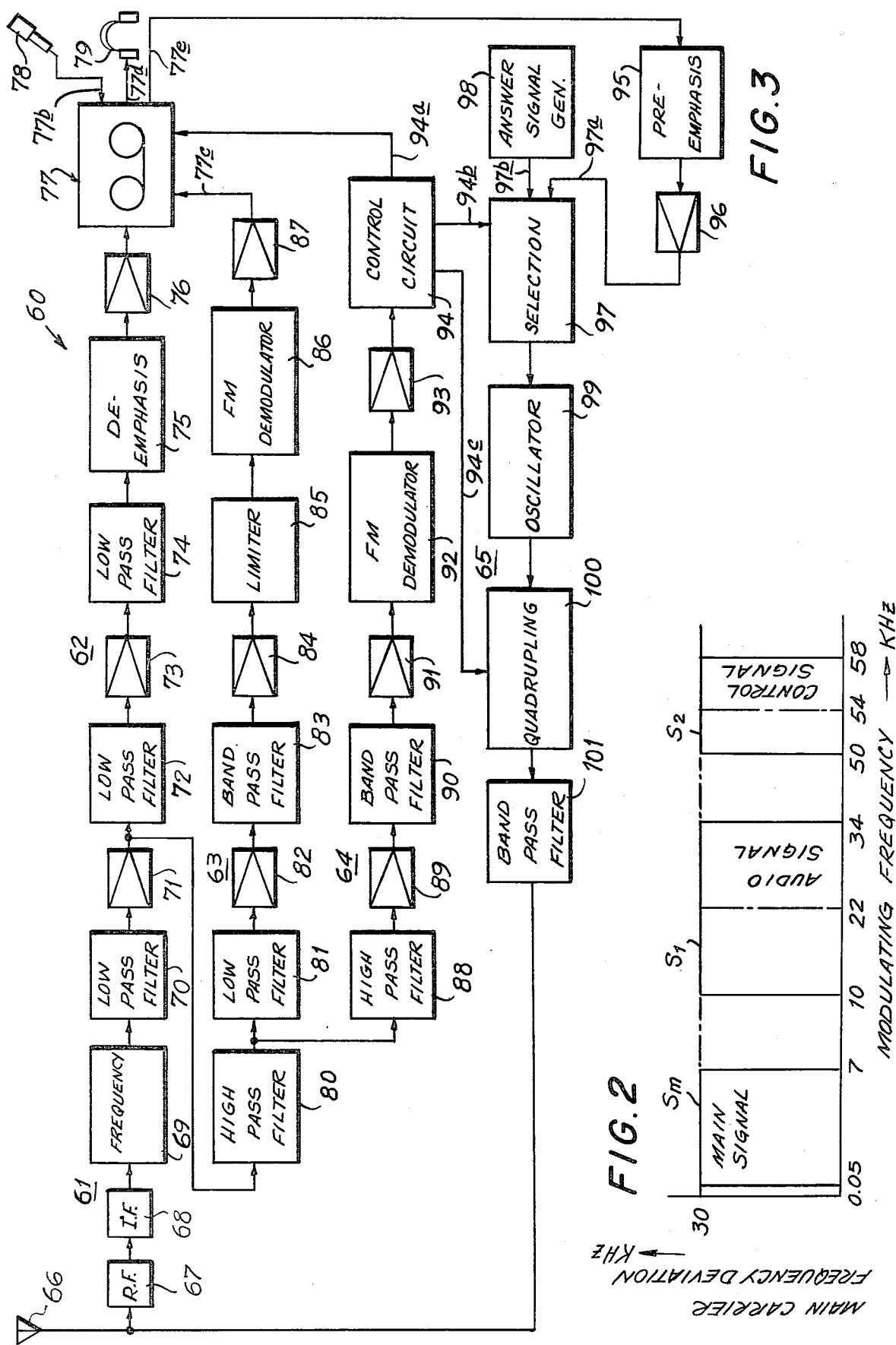

SIGNAL TRANSMISSION IN TEACHING SYSTEM

BACKGROUND OF THE INVENTION

1. Field of the Invention

This invention relates generally to teaching systems, for example, as in so-called language laboratories, and more particularly is directed to improvements in the transmission of various signals between a master or central station at which a proctor or supervisor of the teaching system may be situated, and one or more student stations remote from the master station.

2. Description of the Prior Art

In most existing teaching systems, for example, as are used in language laboratories, numerous electrical cables extend between a master station and one or more student stations for the exchange therethrough of various signals, such as, the main signals representing teaching or instructional materials played from tapes or other records at the master station, audio signals for communication between the proctor or supervisor and the various students, control signals for controlling, from the master station, devices situated at the student stations, such as the tape or other record players for recording and/or reproducing the main signals and/or audio signals from the students, and answer-representing signals transmitted from the various student stations to the master station for evaluation or scoring thereat. In the existing teaching systems, as aforesaid, the numerous cables required for exchanging the signals between the master and student stations are expensive to install, and substantially prevent the transportation from one locale to another of the equipment comprising the teaching system. Accordingly, as a practical matter, the existing teaching systems are permanent installations which, therefore, are available for use only in rather restricted areas.

In view of the foregoing, it has been suggested to effect radio or wireless transmission of the signals that need to be exchanged between the master and student stations of teaching systems as such mode of transmission, even though it requires transmitters and receivers, is less costly than the conventional arrangement employing cables and, furthermore, permits the teaching system to be conveniently transported and easily set up for use at various sites. However, problems arise in the radio or wireless transmission of signals in teaching systems by reason of the relatively large number of different types of signals that need to be transmitted, particularly from the master station to each student station. As previously mentioned, in the case of a teaching system to be used as a language laboratory, the signals which need to be transmitted from the master station to each student station may include at least main signals such as may be reproduced by a tape or other record player from a recorded master tape, audio signals for communication between the proctor, supervisor or teacher and the students, and control signals for remotely controlling from the master station devices, such as the above-noted tape or other record players, situated at the student stations. When wireless or radio transmission is employed for the foregoing different types of signals, different frequency bands are assigned to the several types of signals, respectively, so that it is necessary to provide each student station with a corresponding number of receivers tuned to the different transmitting frequencies. Accordingly, existing teaching systems employing radio or wireless signal transmission are complex and relatively costly, and do not provide wholly reliable operation.

OBJECTS AND SUMMARY OF THE INVENTION

Therefore, it is an object of this invention to provide a teaching system which overcomes the previously mentioned problems associated with the prior art.

More particularly, it is an object of this invention to provide a signal transmission apparatus in a teaching system which is of relatively simple construction and yet capable of transmitting various different signals between the master and student stations.

Another object is to provide a signal transmission apparatus for a teaching system, as aforesaid, in which certain signals to be transmitted from the master station to each of the student stations, for example, the audio and control signals, are multiplexed on other signals to be thus transmitted, for example, on the main signals representing teaching or instructional materials, with the result that all of the signals can be transmitted through a single channel which may be constituted by a radio frequency band or by a single cable.

A further object is to provide a signal transmission apparatus for a teaching system, as aforesaid, in which main signals representing teaching or instructional materials are provided from a number of sources at the master station and may be transmitted simultaneously along with the audio and control or other signals multiplexed thereon, and the main signals representing desired teaching or instructional materials may be conveniently selected for reception at any one of the student stations.

In accordance with an aspect of this invention, a teaching system having at least one source of main signals in a first frequency band, a source of audio signals and a source of control signals is provided with a signal transmission apparatus comprising means for modulating a carrier with the audio signals so as to provide a first auxiliary signal in a frequency band removed from the first frequency band of the main signals, means for modulating a carrier with the control signals so as to provide a second auxiliary signal in a frequency band removed from the first frequency band and from the frequency band of the first auxiliary signal, means for combining or multiplexing the main signals and the first and second auxiliary signals so as to provide a composite signal therefrom, means for modulating a carrier of predetermined frequency with the composite signal, and transmitting means for transmitting the carrier modulated with the composite signal. In the case where the foregoing signal transmission apparatus is situated at a master station from which the carrier modulated with the composite signal is transmitted, at least one student station is spaced from the master station and has situated thereat reception means for receiving the carrier modulated by the composite signal, demodulating means for obtaining the composite signal from the received modulated carrier, and filter means for separating the main, audio and control signals from the demodulated composite signal.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 2 is a diagrammatic view showing the frequency spectrum of various signals which are multiplexed for transmission from the master station shown on FIG. 1;

FIG. 3 is a schematic block diagram showing components of a teaching system according to an embodiment of this invention which are situated at a student station of such system, and which are intended to be used with the components shown on FIG. 1 at its master or central station.

DESCRIPTION OF THE PREFERRED EMBODIMENTS

Figure 1:
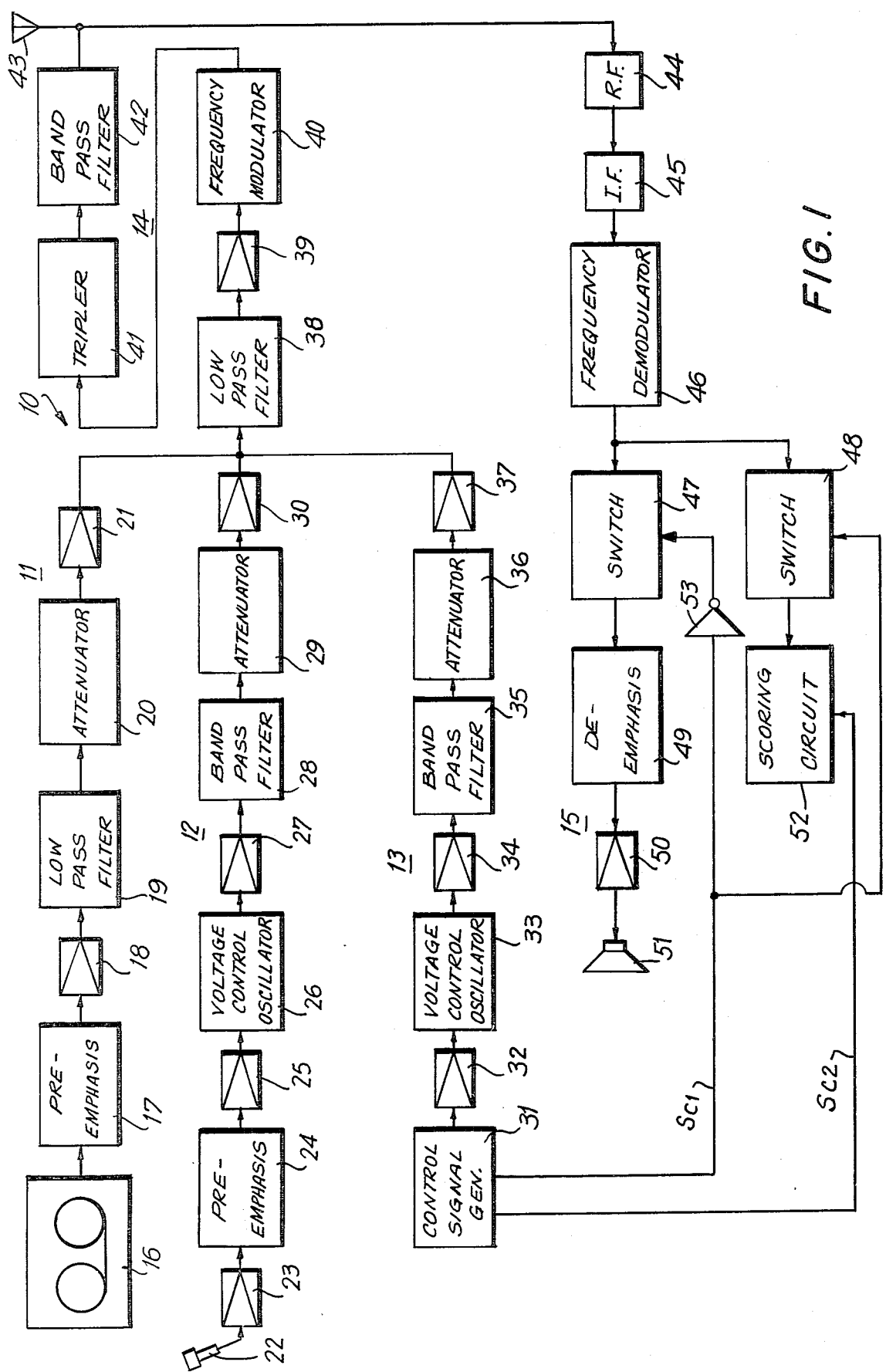
FIG. 1 is a schematic block diagram showing components of a teaching system according to one embodiment of this invention which are situated at a master or central station of such system.

Referring to the drawings in detail, and initially to FIG. 1 thereof, it will be seen that, at a central or master station 10 of a teaching system according to this invention, there are generally provided a main signal section 11 for reproducing instructional or teaching materials which, for example, may be recorded on magnetic tapes or the like, an audio signal section 12 for intercommunication between a teacher or proctor at master station 10 and one or more students situated at respective student stations, a control signal section 13 for controlling the operations of equipment at the master station 10 and at various student stations, a transmission section 14 for transmitting a modulated signal which is a composite of signals derived from the sections 11, 12 and 13, and a reception section 15 for receiving signals transmitted from each student station.

More particularly, in the illustrated embodiment of the invention, the main signal section 11 at master station 10 is shown to include a main signal source 16, for example, in the form of an audio or video tape recorder or the like, supplying main signals representing teaching or instructional materials to a preemphasis circuit 17 which has its output supplied through an amplifier 18 to a low-pass filter 19. The low-pass filter 19 has a cut-off frequency of 7 KHz so as to pass therethrough only the output of amplifier 18 in a band of, for example, 0.05 to 7 KHz. The output of low-pass filter 19 is supplied through an attenuator 20 and a buffer amplifier 21 to provide the main signal $S_m$ (FIG. 2) in the frequency band of 0.05 to 7.0 KHz.

In the embodiment of the invention illustrated on FIG. 1, the audio signal section 12 is shown to include a source of audio signals, for example, in the form of a microphone 22, which supplies audio signals representing voice communication from the teacher or proctor at master station 10, through an amplifier 23 to a preemphasis circuit 24. The output of circuit 24 is passed through a buffer amplifier 25 to constitute a controlling voltage for a voltage controlled, variable frequency oscillator 26 which, for example, may have an oscillation output with a center frequency of 22 KHz. The oscillation output of oscillator 26, which is frequency modulated by the audio signals from microphone 22, is supplied through a buffer amplifier 27 to a band-pass filter 28 which, for example, limits the band width of the resulting frequency modulated signal from 10 to 34 KHz. The output of filter 28 is supplied through an attenuator 29 and a buffer amplifier 30 to provide a first auxiliary signal $S_1$ (FIG. 2) in a frequency band (10 KH$_z$ to 34 KH$_z$) which is removed from the frequency band (0.05 to 7 KHz) of main signals $S_m$ obtained from buffer amplifier 21.

In the control signal section 13 at master station 10 of the illustrated teaching system according to this invention, control signals from a control signal generator or source 31 are supplied through a buffer amplifier 32 to provide a control voltage for a voltage controlled variable frequency oscillator 33 which produces an oscillation output with a center frequency of, for example, 54 KHz. Thus, the output from oscillator 33 is constituted by a carrier having the center frequency of 54 KHz and which is frequency modulated by the control signals from source 31. The frequency modulated signal from oscillator 33 is supplied through a buffer amplifier 34 to a band pass filter 35 which suitably limits the band width of the frequency modulated signal passing therethrough, for example, to between 50 and 58 KHz. The frequency modulated signal passing through filter 35 is supplied through an attenuator 36 and a buffer amplifier 37 to provide a second auxiliary signal in a frequency band (50 KH$_z$ to 58 KH$_z$) which is removed from the first frequency band (0.05 to 7 KHz) of the main signals from section 11 and also removed from the frequency band (10 to 34 KHz) of the first auxiliary signal from audio signal section 12. The control signal generator or source 31 may comprise a specially programmed general purpose computer, a special purpose computer, a various gate and switching circuits well-known to those of ordinary skill in the art, so as to provide the required control signals which include command signals for controlling operations of various components at each of the student stations and associated address signals by which the student station is to be controlled by the command signals is designated, and also signals for controlling operations of the reception section 15, as hereinafter described.

The outputs of buffer amplifiers 21, 30 and 37 are shown to be connected together for multiplexing the first and second auxiliary signals obtained from audio signal section 12 and control signal section 13, respectively, on the main signals obtained from main signal system 11, whereby to provide a composite signal. Such composite signal is applied to transmission section 14 which is shown to include a low-pass filter 38 having a suitable cut-off, for example, passing only those components of the composite signal having frequencies below 70 KHz. The resulting output of filter 38 is applied through a buffer amplifier 39 to a frequency modulator 40 in which the composite signal frequency modulates a carrier having a frequency of, for example, 26.333 MHz. The frequency modulated signal from modulator 40 is applied to a frequency multiplier or tripler 41 in which the center or carrier frequency of the composite FM signal is converted to 79 MHz. The output of frequency multiplier or tripler 41 is applied through a band pass filter 42 to an antenna 43 for wireless or radio transmission from the latter of the FM signal with the frequency 79 MH$_z$.

It will be appreciated that frequency modulator 40 in signal transmitting section 14 receives main signals in the frequency band of 0.05 to 7 KHz, a first frequency-modulated auxiliary signal in the band 10 to 34 KHz and a second frequency-modulated auxiliary signal in the band 50 to 58 KHz, with such first and second frequency-modulated auxiliary signals being frequency multiplexed on the main signals to provide the composite signal which is then frequency modulated in modulator 40 and transmitted. The attenuators 20, 29 and 36 in main signal section 11, audio signal section 12 and control signal section 13, respectively, are employed to adjust the levels of the respective signals so that the frequency modulated signal from modulator 40 will have a frequency deviation band of ±30 KHz.

The reception section 15 at master station 10 is intended to receive signals transmitted from the several student stations, as hereinafter described, and is shown to include a radio frequency or RF stage 44 connected with antenna 43 and being turned to the frequency, for example, 105 MHz, at which signals are transmitted from each student station, and which is different from the frequency, for example, 79 MHz, at which signals are transmitted from transmission section 14. Thus, RF stage 44 receives from antenna 43 signals transmitted from the several student stations and applies such received signals to an intermediate frequency or IF stage 45 having its output connected to a frequency demodulator 46 in which the received signals from a student station are demodulated. The demodulated signals from demodulator 46 are applied to switch or gate circuits 47 and 48 which are alternatively made conductive for supplying the demodulated signals either through a deemphasis circuit 49 and an amplifier 50 to a transducer or loudspeaker 51, or to a scoring circuit 52. For controlling the switch or gate circuits 47 or 48, a suitable control signal $S_{cl}$ is supplied from control signal generator 31 directly to switch or gate circuit 48 and through an inverter 53 to switch or gate circuit 47. Thus, by way of example, when control signal generator 31 causes signal $S_{cl}$ to be at a high level, switch or gate circuit 48 is changed-over to its conductive state to pass the demodulated signals from demodulator 46 to scoring circuit 52 while switch or gate circuit 47 is in its non-conductive state. On the other hand, when control signal $S_{cl}$ is at its low level, switch 48 is made non-conductive and switch 47 is made conductive to pass the demodulated signals from demodulator 46 to loudspeaker 51 so as to emerge from the latter as audible sounds or speech. The control signal generator 31 is further shown to provide control signals $S_{c2}$ to scoring circuit 52 so that, when switch or gate circuit 48 is made conductive to pass the demodulated signals from demodulator 46 to scoring circuit 52, the latter will identify the answer-representing signals then being received as coming from particular student stations and will tabulate or score the answers for each student. In other words, answer-representing signals are transmitted sequentially from the several student stations on a time-shared basis, and the signals $S_{c2}$ applied to scoring circuit 52 correspond to such time-sharing to ensure that scoring circuit 52 will evaluate the performance of each of the students at the several stations on the basis of the corresponding answer-representing signals transmitted therefrom.

Referring now to FIG. 3, it will be seen that, at each student station 60 of a teaching system according to this invention, there are generally provided a receiving section 61 for receiving the composite FM signal transmitted from master station 10, a main signal section 62 for handling main signals separated from the received composite signal and which, for example, represent teaching or instructional materials, an audio signal section 63 for handling audio signals separated from the received composite signal and which represent voice communications or instructions from the proctor or teacher at master station 10, a control signal section 64 for handling control signals separated from the received composite signal and by which components of main signal section 62 as well as other components at the respective student station 60 are controlled, and a transmission section 65 for transmitting from the respective student station 60, for example, to the reception section 15 at master station 10, audio signals representing voice communications from the student at station 60 and signals representing the answers of such student to questions that may be promulgated by certain of the main signals.

More particularly, in the illustrated embodiment of the invention, reception section 61 at each student station 60 is shown to include an antenna 66 for receiving the composite FM signal transmitted from antenna 43 at master station 10 with a predetermined frequency, for example, of 79 MHz, a radio frequency or RF stage 67 tuned to 79 MHz for receiving the transmitted signal from antenna 66 and an intermediate frequency or IF stage 68 through which the received signal is applied to a frequency demodulator 69 for obtaining the composite signal. The demodulated composite signal is applied from demodulator 69 through a low-pass filter 70 which, for example, permits the passage therethrough only of signals in the band below 70 KHz, to an amplifier 71.

The output of amplifier 71 which comprises essentially the demodulated composite signal is applied to main signal section 62 which is shown to include a low-pass filter 72 having a cut-off frequency of, for example, 8.4 KHz, so that only the frequency components below that value pass through filter 72 and a buffer amplifier 73 to a low-pass filter 74 having a cut-off frequency of, for example, 7 KHz. Thus, only the main signal component of the demodulated composite signal passes through low-pass filter 74 and a deemphasis circuit 75 to an amplifier 76. The output of amplifier 76 is applied to a main signal input 77a of a recording and/or reproducing apparatus 77 which, for example, may be in the form of a tape recorder, and as hereinafter described in detail, is controllable by the control signal component of the demodulated composite signal. The recording and/or reproducing apparatus 77 at each student station 60 may have additional or auxiliary inputs 77b and 77c to selectively receive audio signals from a microphone 78, that is, audio signals from the respective student, and audio signals from section 63, respectively. Further, recording and/or reproducing apparatus 77 may have outputs 77d and 77c to selectively apply reproduced main signals or audio signals to headphones 79, or reproduced audio signals to transmission section 65, respectively.

The demodulated composite signal from amplifier 71 of reception section 61 is further shown to be applied to a high-pass filter 80 which, for example, passes all frequency components above 8.4 KHz. The audio signal section 63 is shown to include a low-pass filter 81 which receives the output of filter 80 and passes the frequency components therein below 43 KHz to a buffer amplifier 82. The output of buffer amplifier 82 is applied to a band pass filter 83 which, for example, passes frequency components in the band from 10 to 34 KHz so that the previously mentioned first auxiliary signal component of the demodulated composite signal is obtained from filter 83. Such first auxiliary signal is applied through an amplifier 84 and a limiter 85 to a frequency demodulating circuit 86 for demodulating the audio signal from the first auxiliary signal, whereupon the demodulated audio signal is supplied through an amplifier 87 to the respective input 77c of recording and/or reproducing apparatus 77.

The control signal section 64 at each student station 60 is shown to include a high-pass filter 88 which receives the output of filter 80 in audio signal section 63, and which passes the frequency components thereof having frequencies higher than 43 KHz through buffer amplifier 89 to a band pass filter 90 having a suitable band width, for example, of 50 to 58 KHz, so that the previously mentioned second auxiliary signal component of the demodulated composite signal is obtained from filter 90. Such second auxiliary signal is applied through an amplifier 91 to a frequency demodulating circuit 92 for demodulating the control signals from the second auxiliary signal, whereupon the demodulated control signals are supplied through an amplifier 93 to a control circuit 94. In response to the demodulated control signals, control circuit 94 suitably provides, at an output 94a thereof, various command signals for controlling the recording and reproducing operations of apparatus 77. More particularly, command signals obtained at output 94a of control circuit 94 in response to control signals from generator 31 at master station 10 are effective to control the recording by such apparatus 77 of the main or instructional signals received at input 77a, the audio signals from the student received at input 77b and the audio signals from the proctor or teacher received at input 77c, and further to control the reproducing by apparatus 77, and the supplying from output 77d to headphones 79 of the main or instructional signals or the audio signals from the proctor or teacher, or the reproducing of the audio signals from the student and the supplying thereof from output 77e to transmission section 65.

The transmission section 65 at each student station 60 is shown to include a preemphasis circuit 95 connected to output 77e of apparatus 77 for receiving the reproduced audio signals from the student and applying the same through an amplifier 96 to one input 97a of a selecting circuit 97. Circuit 97 is further shown to have a second input 97b which receives answer-representing signals from an answer signal generator 98. The generator 98 is actuable by a student at the respective station 60 and may be of any suitable known type, for example, as disclosed in U.S. Pat. No. 4,052,798, having a common assignee herewith, to provide a signal which identifies the student's answer to a multiple choice or other similar question. The selecting circuit 97 is actuable by command signals received from an output 94b of control circuit 94 so as to be selectively operative to apply either audio signals from the student, by way of preemphasis circuit 95 and amplifier 96, or answer-representing signals from generator 98 as a control voltage for a voltage-controlled variable frequency oscillator 99 which, for example, has a center frequency of 26.25 MHz. Thus, the output of oscillator 99 is a carrier of 26.25 MHz which is frequency modulated with either the audio signals from the respective student or the answer-representing signals. Such FM output from oscillator 99 is applied to a frequency multiplier or quadrupling circuit 100 which is selectively made operative by a command signal from an output 94c of control circuit 94 to convert the FM signal from oscillator 99 to a similar FM signal having a center frequency of 105 MHz which is passed through a band pass filter 101 to antenna 66 for wireless or radio transmission from the latter.

As previously noted, communications between the several student stations and the master station are effected on a time-sharing basis in response to suitable control signals from generator 31 in control signal section 13 at the master station. Thus, for example, at each of the student stations 60, the main signals applied to input 77a of apparatus 77 and the audio signals from the proctor or teacher applied to input 77c are suitably recorded and can be reproduced, at will, so as to be available at output 77d to which headphones 79 are connected. Thus, a student at each station 60 can listen to the instructional material and related question or questions represented by the main signals and/or to the audio signals representing oral communications from the proctor or teacher, as such main and audio signals are reproduced by apparatus 77. The student can then actuate answer signal generator 98 so as to provide signals representing an answer the student believes to be correct. If desired or necessary, the student can further speak into microphone 78 to provide audio signals from the student which are recorded by apparatus 77.

Upon occurrence of the time-sharing period for transmission from the respective student station 60, control circuit 94 responds to the control signals which originated in generator 31 to provide suitable command signals at outputs 94b and 94c so that frequency multiplier or quadrupling circuit 100 is made operative and selecting circuit 97 alternately passes the audio signals from the student applied to input 97a and the answer-representing signals applied to input 97b. Thus, the frequency modulated signal having a center frequency of 105 MHz and being modulated alternately by the audio signals from the student and the answer-representing signals is transmitted at appropriate times from antenna 66 at the respective student station 60 and is receivable by antenna 43 at master station 10. At the same appropriate times, the signal $S_{c1}$ from control signal generator 31 ensures that the demodulated audio signal from a student at a particular student station will pass through switch 47 to loudspeaker 51 and thus provide voice communication of that student with the proctor or teacher, while the demodulated answer-representing signals from such student will be passed through switch 48 to scoring circuit 52. Furthermore, as previously noted, the control signals $S_{c2}$ from generator 31 ensure that the demodulated answer-representing signals transmitted to scoring circuit 52 are attributed by the latter to the correct student station.

It will be appreciated that, since the audio signals from the proctor or teacher at master station 10 and the control signals from generator 31 at such station are multiplexed on the main signals from apparatus 16, all of the foregoing signals can be transmitted by one radio wave so that only a single radio receiver is required at each of the student stations. Therefore, a teaching system according to this invention is of relatively simple and inexpensive construction.

In the embodiment illustrated on FIGS. 1 and 3, only a single source of main signals or instructional materials is provided at master station 10 in the form of a tape recorder 16, but it is to be appreciated that the present invention can also be applied to a teaching system, such as, a so-called language laboratory, in which a student at any one of the student stations may select from among several different courses of instruction. More particularly, as shown on FIG. 4, in which components corresponding to those previously described with reference to FIGS. 1 and 3 are identified by the same reference numerals, at a master station 10A there are provided a plurality of, for example, four, main signal sections 11A, 11B, 11C and 11D, respectively. Each of the main signal sections 11A–11D is similar to the main signal section 11 of FIG. 1, but with the main signals recorded in the tape recorder thereof corresponding to that indicated at 16 on FIG. 1, representing a particular course of instructional materials which is different for each of sections 11A–11D. The master station 10A is further shown on FIG. 4 to have a plurality of transmission sections 14A, 14B, 14C and 14D, each being similar to the transmission section 14 on FIG. 1, but having different respective carrier frequencies as determined by the frequency modulator and tripler thereof corresponding to the modulator 40 and tripler 41 of the transmission section 14 on FIG. 1. Thus, for example, the transmission sections 14A, 14B, 14C, and 14D may have carrier frequencies of 79, 81, 83 and 85 MHz, respectively. The transmission sections 14A, 14B, 14C and 14D are supplied, at their inputs, with the main signals from main signal sections 11A, 11B, 11C and 11D, respectively, and each of the transmission sections 14A–14D is also supplied with the first and second frequency modulated auxiliary signals from audio signal section 12 and control signal section 13, respectively. It will be appreciated that, in the case of a teaching system having master station 10A, there is simultaneously radiated from antenna 43 carrier signals having the different frequencies of 79, 81, 83 and 85 MHz, respectively, which are frequency modulated with respective composite signals each of which is comprised of characteristic main signals representing a respective course of instruction and on which there are multiplexed the audio signals and control signals from sections 12 and 13. Furthermore, as in the case of the master station 10 described with reference to FIG. 1 a reception section 15 is situated at master station 10A and connected with antenna 43 for receiving signals transmitted from the several student stations, for example, with a carrier frequency of 105 MHz.

Figure 4:
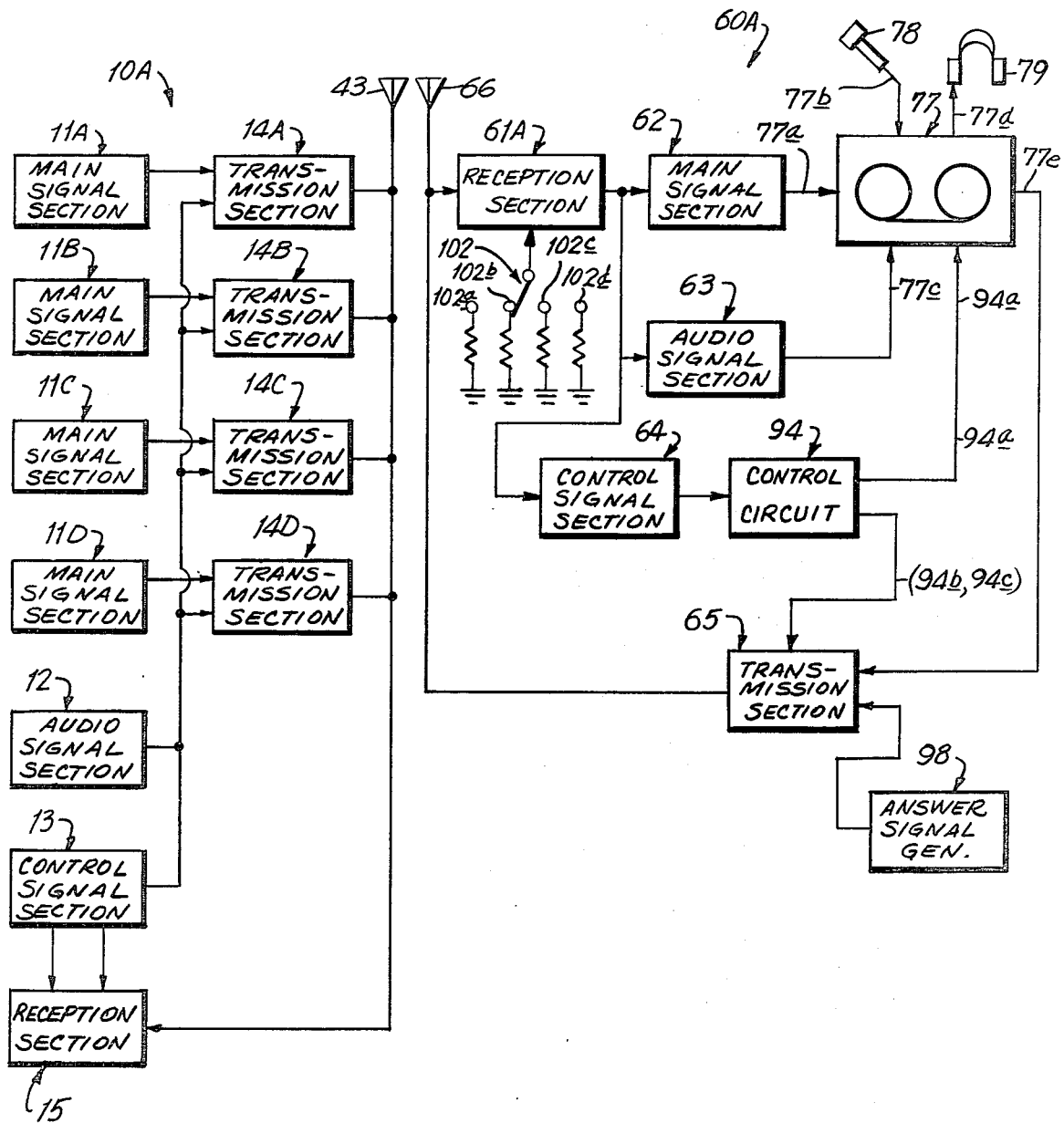
FIG. 4 is a simplified schematic block diagram generally illustrating components at both master and student stations of a teaching system according to another embodiment of this invention.

In the case of a teaching system adapted to permit the student at each student station 60A to select a particular course of instruction from among those provided by main signal sections 11A, 11B, 11C and 11D at master station 10A, the reception section 61A at each student station is generally similar to the receiving section 61 on FIG. 3 but is provided with a manually actuable device 102 by which the receiving frequency can be varied. More specifically, as shown, the device 102 for varying the receiving frequency may be constituted by a four-way switch having contacts 102a, 102b, 102c and 102d which may be selectively engaged for tuning the receiving section 61A to the carrier frequencies 79, 81, 83 and 85 MHz with which the frequency modulated signals are transmitted from transmission sections 14A, 14B, 14C and 14D, respectively. Apart from the foregoing, each student station 60A of the teaching system illustrated by FIG. 4 is shown to be the same as the student station 60 described in detail above with reference to FIG. 3.

It will be appreciated that, with the teaching system according to this invention, as described above with reference to FIG. 4, a student at any one of the student stations 60A can selectively study any one of various different courses of study or instruction simply by changing the receiving frequency of reception section 61A. Since only a single audio signal section 12 and only a single control signal section 13 are employed at master station 10A, the first and second auxiliary signals issuing from sections 12 and 13 can be multiplexed with the different main signals issuing from the main signal sections 11A, 11B, 11C and 11D, similarly to the arrangement in FIG. 1. Thus, a relatively simple arrangement is possible in accordance with this invention even when various courses of instruction or teaching materials are to be transmitted from the master station.

In each of the above-described embodiments of the invention, there has been wireless or radio transmission of the signals from antenna 43 at the master station 10 or 10A to antenna 66 at each of the student stations 60 or 60A. However, it is to be appreciated that the present invention can also be applied to teaching systems in which the signals are transmitted through cables between the master station and each of the student stations. In the latter case, it will be appreciated that the present invention makes it possible to substantially decrease the number of cables required for transmission between the stations. In the case of a teaching system having cable transmission between the stations in accordance with this invention, the stability of signal transmission is improved, as compared with the transmission by wireless or radio, but some reduction in the convenience or facility with which the teaching system can be transported from one site to another is inherent in using even the reduced number of cables for transmitting signals between the stations.

Having described illustrative embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A teaching system comprising a master station including at least one source of main signals in a first frequency band, a source of audio signals, a source of control signals, and signal transmission apparatus comprising means for modulating a subcarrier with said audio signals so as to provide a first auxiliary signal in a frequency band removed from said first frequency band, means for modulating a subcarrier with said control signals so as to provide a second auxiliary signal in a frequency band removed from said first frequency band and said frequency band of the first auxiliary signal, means for multiplexing said main signals and said first and second auxiliary signals so as to provide a composite signal therefrom, means for modulating a carrier of predetermined frequency with said composite signal, and transmitting means for transmitting said carrier modulated with the composite signal; and at least one student station spaced from said master station and at each of which there are situated reception means tunable to said predetermined frequency of said carrier, demodulating means for obtaining said composite signal from the received modulated carrier, and filter means for separating said main, audio, and control signals from the demodulated composite signal; wherein said control signals from said source include a plurality of command signals each associated with a respective student station to selectively control the operation of the associated respective student station, and each said student station includes control circuitry responsive to its respective command signal so that each said student station is selectively controlled in response to said respective command signal notwithstanding that said control signals are also received by other such student stations.

2. A teaching system according to claim 1; in which there is at least another source of main signals in said first frequency band; said signal transmission apparatus further comprises means for multiplexing said main signals from said other source and said first and second auxiliary signals so as to provide another composite signal therefrom, and means for modulating another carrier of a predetermined frequency different from the first mentioned predetermined frequency with said other composite signal; and said other carrier modulated with said other composite signal is also supplied to said transmission means for transmission by the latter.

3. A teaching system according to claim 2; wherein said reception means of each said student station is tunable to said predetermined frequency of a selected one of said carriers transmitted by said transmission means for receiving said one carrier modulated by a respective composite signal.

4. A teaching system according to claim 1; in which each said carrier modulated with said respective composite signal has a radio frequency for wire-less transmission from said transmission means to said reception means.

5. A teaching system according to claim 1; in which at each said student station, there are further provided answer means actuable by a student for providing answer-representing signals, a source of audio signals from the student, and transmission means for selectively transmitting said answer-representing signals and said audio signals from the student; and in which, at said master station, there are further provided reception means for receiving the selectively transmitted answer representing signals and audio signals from a student.

6. A teaching system according to claim 5; in which at said master station, there are further provided transducer means operable by said audio signals from the student to provide audible sounds, scoring means for scoring the performance of each student in response to the respective answer-representing signals, and switch means controllable by control signals from said source of the latter for selectively applying signals received by said reception means at the master station to said transducer means and to said scoring means, respectively.

7. A teaching system according to claim 5; in which said transmission means at each said student station includes modulating means and selecting means for selecting said answer-representing signals and said audio signals from the student for modulation of a carrier by the respective modulating means; and further comprising, at each said student station, control circuit means operable by said control signals separated from the demodulated composite signal for controlling said selecting means.

8. A teaching system according to claim 1; in which, at each said student station, there are further provided recording and reproducing means under the control of said control signals separated from said demodulated composite signal for recording and reproducing said main and audio signals separated from said demodulated composite signal.

9. A teaching system according to claim 8; in which, at each said student station, there are further provided answer means actuable by a student for providing answer-representing signals, a source of audio signals from the student connected with said recording and reproducing means so that the latter further functions, under the control of said control signals separated from the demodulated composite signal, to record and reproduce said audio signals from the student, and transmission means for selectively transmitting said answer-representing signals and said audio signals from the student by way of said recording and reproducing means; and in which, at said master station, there are further provided reception means for receiving the selectively transmitted answer-representing signals and audio signals from the student.

10. A teaching system according to claim 9; in which, at said master station, there are further provided transducer means operable by said audio signals from the student to provide audible sound, scoring means for scoring the performance of each student in response to the respective answer-representing signals, and switch means controllable by control signals from said source of the latter for selectively applying signals received by said reception means at the master station of said transducer means and to said scoring means, respectively.

11. A teaching system according to claim 10; in which said transmission means at each said student station includes modulating means, and selecting means for selecting said answer-representing signals and said audio signals from the student by way of said recording and reproducing means for modulation of a carrier by the respective modulating means; and further comprising, at each said student station, control circuit means operable by said control signals separated from the demodulated composite signal for controlling said selecting means as well as said recording and reproducing means.

12. A teaching system according to claim 11; in which said carrier selectively modulated with said answer-representing signals and said audio signals from the student, as transmitted from the respective student station, has a frequency band substantially removed from the frequency band of said carrier modulated with the composite signal as transmitted from said master station.

* * * * *